United States Patent [19]

Ferrell

[11] 4,262,581
[45] Apr. 21, 1981

[54] METHOD AND APPARATUS FOR MAKING PRINTED GUSSET BAGS

[75] Inventor: Robert A. Ferrell, Shelbyville, Ind.
[73] Assignee: KCL Corporation, Shelbyville, Ind.
[21] Appl. No.: 36,005
[22] Filed: May 4, 1979
[51] Int. Cl.³ ............................................. B31B 35/00
[52] U.S. Cl. .................................. 493/188; 493/194; 493/256
[58] Field of Search .................. 93/35 R, 35 SB, 8 R, 93/20, 33 H, 14, 17–19, 84 TW, 84 FF

[56] References Cited

U.S. PATENT DOCUMENTS

| Re. 28,959 | 9/1976 | Naito | 29/450 |
|---|---|---|---|
| 575,062 | 1/1897 | Getten | 93/34 |
| 2,544,044 | 3/1951 | Reber et al. | 93/84 TW |
| 3,286,005 | 11/1966 | Cook | 93/34 UX |
| 3,372,625 | 3/1968 | Simecek et al. | 93/84 TW |
| 3,847,711 | 11/1974 | Howard | 156/515 |
| 3,897,530 | 7/1975 | Leathers | 93/84 FF |

FOREIGN PATENT DOCUMENTS 1288295  12/1961  Fed. Rep. of Germany .............. 93/34

OTHER PUBLICATIONS

Reifenhauser Technical Bulletin (4 sheets), re: "Lemo Vertimat 850/V"; Lemo Intermat 1100/U, mail room date 7/30/79.

Primary Examiner—James F. Coan
Attorney, Agent, or Firm—Hill, Van Santen, Steadman, Chiara & Simpson

[57] ABSTRACT

A method of and apparatus for making printed gusset bags from tubular bag material, which may be extruded film plastic with integral interlocking fastener profiles along the edges of panels of the material which have been collapsed into face-to-face relation, and in which each of the panels will provide a succession of separate finished bags, comprising the step of and means for imprinting on each of the panels indicia on bag wall areas and on a gusset area intermediate the wall areas, the step of and means for manipulating the imprinted bag material from the originally collapsed condition to fold the wall areas of each of the panels together into face-to-face relation and to infold the gusset area of each of said panels into position between the folded bag wall areas of each of the panels, and the step of and means for separating the gusseted panels into individual gusset bags. When filled, the bags will present to view not only the indicia on the bag walls, but also the indicia on the expanded gusset area of each of the bags.

19 Claims, 12 Drawing Figures

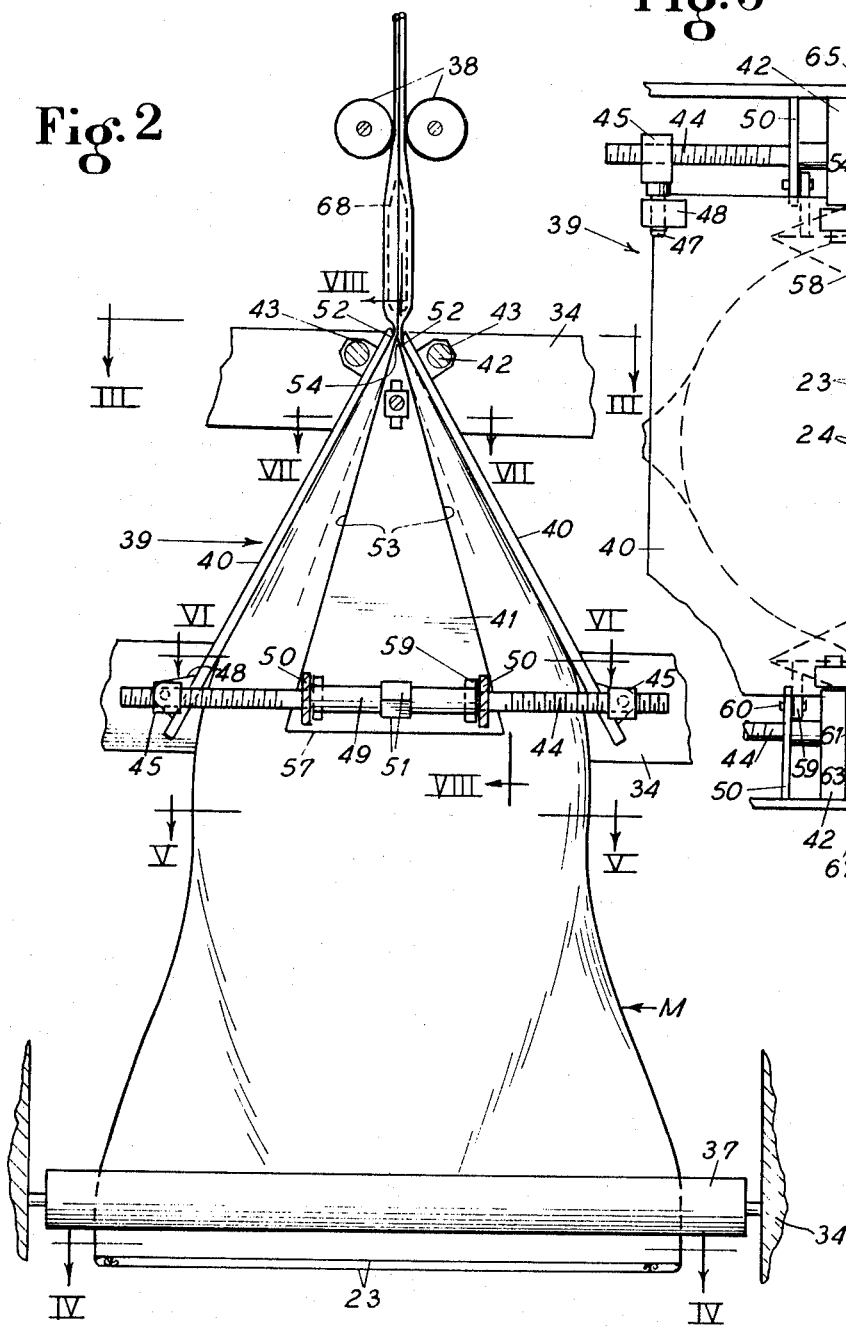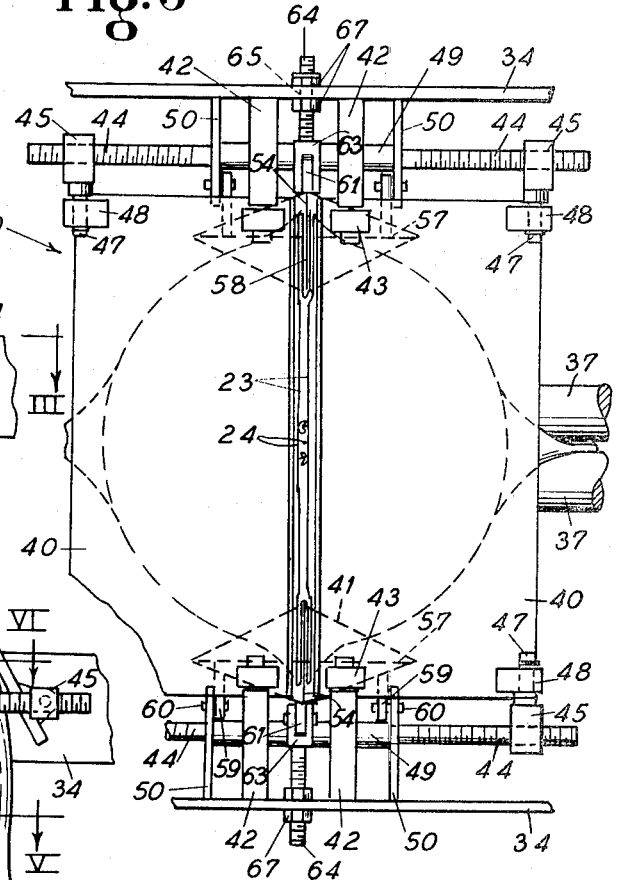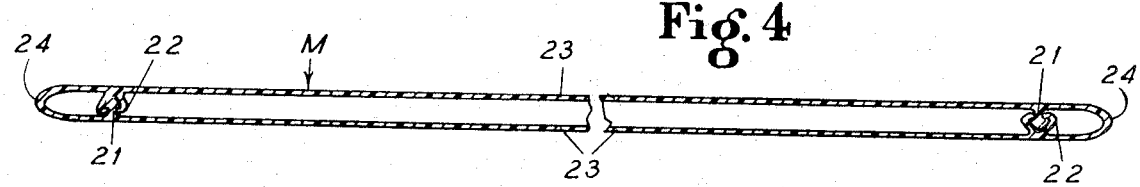

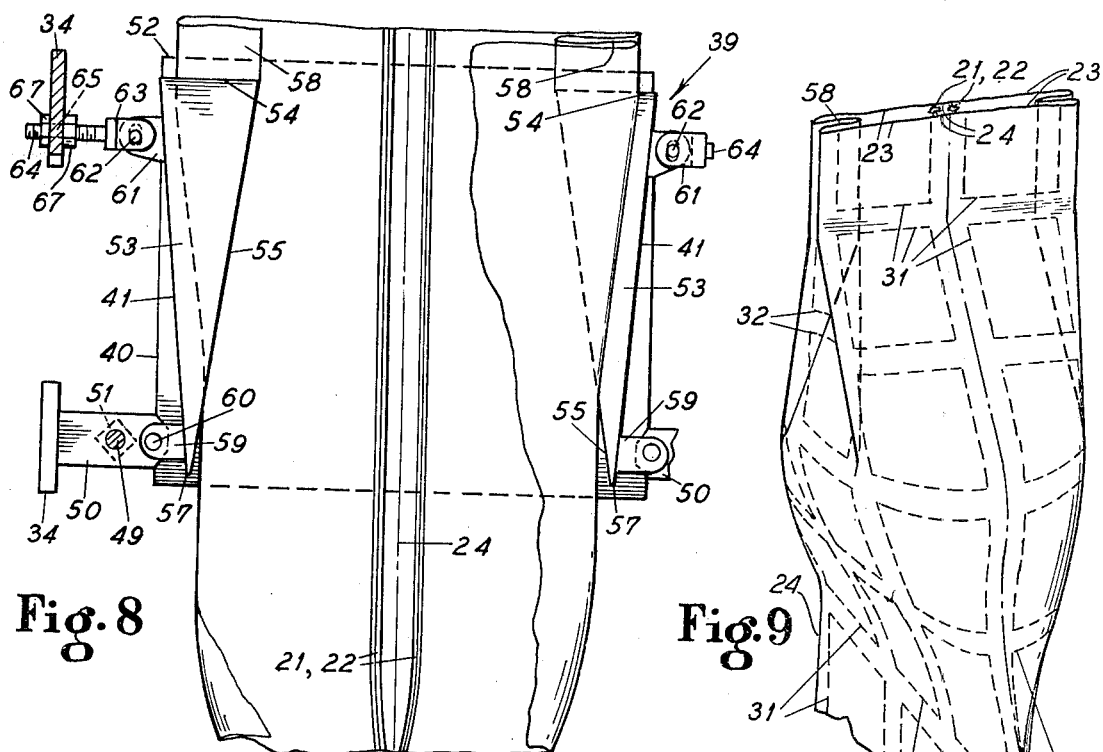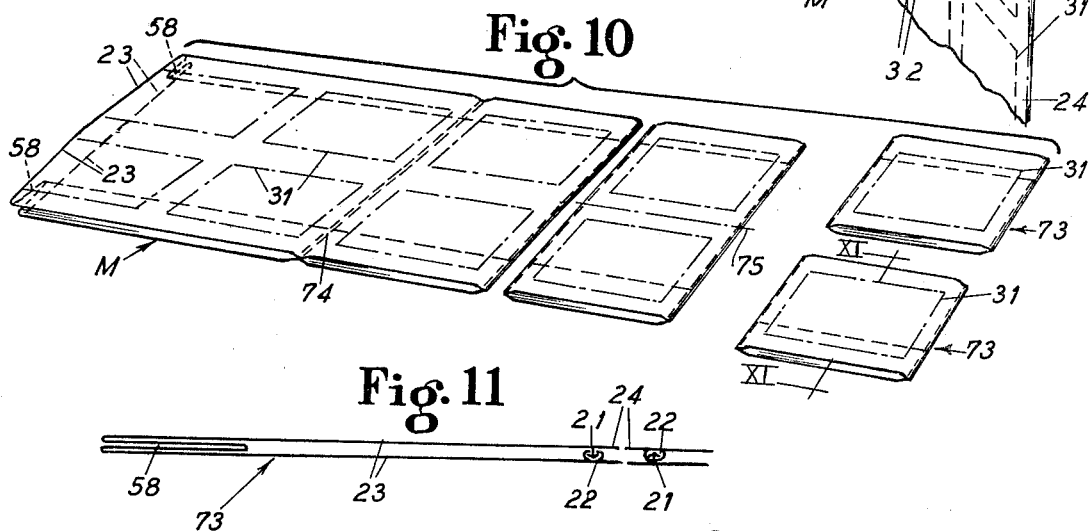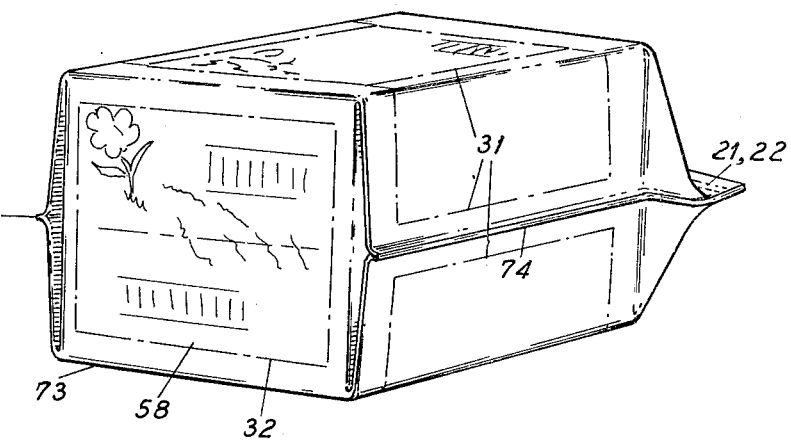

METHOD AND APPARATUS FOR MAKING PRINTED GUSSET BAGS

This invention relates to method and apparatus for making printed gusset bags, and is more particularly concerned with the production of bags, which when filled, will present to view not only indicia imprinted on the bag walls, but also imprinted on expanded gusset area of each of the bags.

Gusset bags having imprinted wall areas and imprinted gusset areas are known for packaging goods which so fill the bags that not only printing on wall areas of the bags but also printing on the gussets are presented to view. This facilitates identifying the packaged goods regardless of whether the filled bags are displayed for sale in position for ready observation of the bag walls or for ready observation of the expanded gusset areas.

However, prior methods and apparatus for production of such bags have been slower and less productive than desirable.

Difficulty has also been encountered in the production of gusseted bags from extruded plastic material having separable fastener profiles.

It is, therefore, an important object of the present invention to provide a new and improved method and apparatus for making printed gusset bags which will substantially increase the number of bags which can be produced in high speed production apparatus, and also to produce such bags efficiently and economically from extruded plastic film having integral separable fastener profiles.

Another object of the invention is to provide new and improved method and apparatus for making printed gusset bags which will double production rate as compared with prior methods and apparatus.

A further object of the invention is to provide new and improved method and apparatus for making printed gusset bags equipped with separable fasteners at open ends of the bags. In a preferred form, an embodiment of the invention provides a method of making printed gusset bags from collapsed tubular bag material having longitudinal face-to-face panels joined to one another along opposite longitudinal side edges, said panels being of sufficient width to derive complete gusseted bags from each panel and each panel being imprinted with indicia on bag wall areas and also imprinted on gusset areas intermediate the wall areas of each of the panels, the method comprising moving said imprinted panels away from another, folding said joined opposite longitudinal side edges together into face-to-face relation, and folding said wall areas of each of the said imprinted panels together into face-to-face relation, and infolding said gusset area of each of said panels into gusset position between said folded bag wall areas of each of said panels, whereby the folded and gusseted panels are adapted to be separated into individual bags which when filled to cause the bag walls and the gussets to be expanded will present to view not only the indicia on the bag walls, but also the indicia on the expanded gusset area of each of the bags.

Also within the principles of the invention, there is provided apparatus for making imprinted gusset bags from collapsed tubular bag material having longitudinal face-to-face panels joined to one another along opposite longitudinal side edges, said panels being of sufficient width to derive complete gusseted bags from each panel, and the panels being imprinted with indicia on bag wall areas and also imprinted with indicia on gusset areas intermediate said wall areas of each of the panels, the apparatus comprising means for moving the imprinted panels away from another, means for folding said opposite longitudinal side edges together into face-to-face relation, and for folding wall areas of each of said imprinted panels together into face-to-face relation, and means for infolding said gusset area of each of said panels into gusset position between said folded bag wall areas of each of said panels, whereby the folded and gusseted panels are adapted to be separated into individual bags which when filled to cause the bag walls and the gussets to be expanded will present to view not only the indicia on the bag walls, but also the indicia on the expanded gusset area of each of the bags.

Other objects, features and advantages of the invention will be readily apparent from the following description of a certain representative embodiment thereof, taken in conjunction with the accompanying drawings although variations and modifications may be effected without departing from the spirit and scope of the novel concepts embodied in the disclosure and in which:

FIG. 2 is an enlarged fragmentary vertical sectional elevational view taken substantially along the line II—II of FIG. 1;

FIG. 3 is a fragmentary plane view taken substantially along the line III—III of FIG. 2;

FIG. 4 is a fragmental sectional detail view taken substantially along the line IV—IV of FIG. 2;

FIG. 8 is a sectional elevational view taken substantially along the line VIII—VIII of FIG. 2;

FIG. 9 is an illustrative perspective showing how the flattened tubular bag material is reshaped for adapting the same to be separated into individual gusseted bags;

Figure 1:
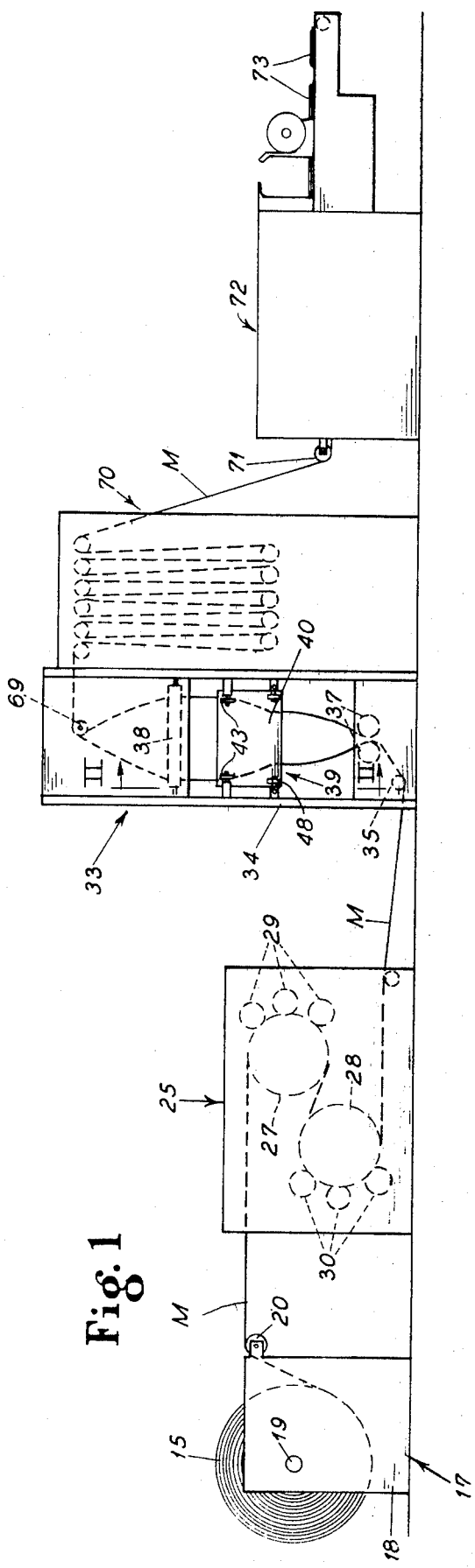
FIG. 1 is a schematic elevational view of apparatus embodying the invention.

FIG. 10 schematically illustrates separation of the reshaped material into individual gusseted bags;

FIG. 11 is an enlarged sectional detail view taken substantially along the line XI—XI of FIG. 10; and FIG. 12 shows one of the gusseted bags filled with contents and presenting to view not only indicia on the bag walls but also indicia on the expanded gusset area of the bag.

Collapsed tubular bag material M (FIG. 1) may be provided in a roll 15 which is adapted to be mounted in means providing a supply station 17 comprising a stand 18 wherein the roll 15 is mounted on a horizontal spindle 19 to be payed out over a guide roller 20. It will be understood that the collapsed tubular material may be of any preferred type made by any preferred manufacturing technique and reeled into rolls of preferred diameter for further processing in accordance with the present invention. If preferred, of course, the material may be processed directly from the material producing apparatus, but generally such producing apparatus is capable of operating at higher production speeds than the processing speed of apparatus according to the present invention wherein the material must be processed as will be described in greater detail hereinafter.

In a preferred form, the material M comprises extruded plastic film tubular bag material which may be manufactured in accordance with any preferred manufacturing technique such, for example, as disclosed in U.S. Pat. No. Re. 28,959, according to which the material is extruded in tubular form and then flattened. Extruded integrally with the tubular material are separable fastener means comprising in each instance, a male profile 21 and a complementary female profile 22 (FIG. 4). For the present purpose, the collapsed tubular bag material has longitudinal face-to-face panels 23 joined to one another along opposite longitudinal side edges 24, and the fastener profiles 21, 22 are located adjacent to the side edges 24 in such relationship that in the supply condition, that is in the roll 15, the profiles 21 and 22 adjacent to each edge are in separably interlocked relation. Furthermore, the profiles 21 and 22 adjacent to each of the sides 24 are respectively reversed relative to the profiles at the opposite side. Thus, the male profile 21 at one side is on one of the panels 23 and the male profile at the opposite side is on the other of the panels 23, whereas just the reverse is true of the female profiles 22. Through this arrangement, when the panels 23 are folded upon themselves as will be explained hereinafter, the male and female profiles on each of the panels are adapted to be secured together to provide a separable closure for bags to be made from each of the panels 23.

Although the material M may be imprinted with any preferred indicia prior to winding the same into the roll 15, it is generally preferred to secure the material from a factory or manufacturing facility adapted for producing the material and then supplying the material to the processing facility either in the same factory or in another factory where imprinting and processing may be effected to provide various customers with their particular imprint requirements and gusset bag quantities, as may be ordered from time to time. Although the material M may be imprinted before being reeled into the roll 15, the unprinted material may, as shown, be advanced from the roll 15 through an imprinting station 25 (FIG. 1) wherein, as indicated, the advancing material M is looped over a backing roller 27 and successively looped over a backing roller 28. While traveling on the perimeter of the backing roller 27, the outer face of one of the panels 23 is imprinted with desired indicia by means of one or more, in this instance shown as three, printing rollers 29, depending upon how many different colors are to be printed on such panel. Similarly, as the material M travels over the perimeter of the backing roller 28, one or more, and in this instance shown as three, printing rollers 30 apply desired printing indicia to the outer face of the other of the panels 23. In the present instance, each of the panels 23 is imprinted with indicia 31 (FIG. 9) on bag wall areas of the panel, and also imprinted on gusset areas 32 intermediate the wall areas 31 of each of the panels. By having the fastener profiles 21, 22 adjacent to respectively the opposite edges 24 of the collapsed tubular material M and joined together, not only is a clear field provided on each of the panels 23 for imprinting by pressure of the printing rollers 29 or 30, as the case may be, against the respective panel 23 as backed up by the associated back-up roller 27 or 28, but also the joined fastener profiles 21, 22 support and protect one another against damage from roll nip pressure.

Figure 5:
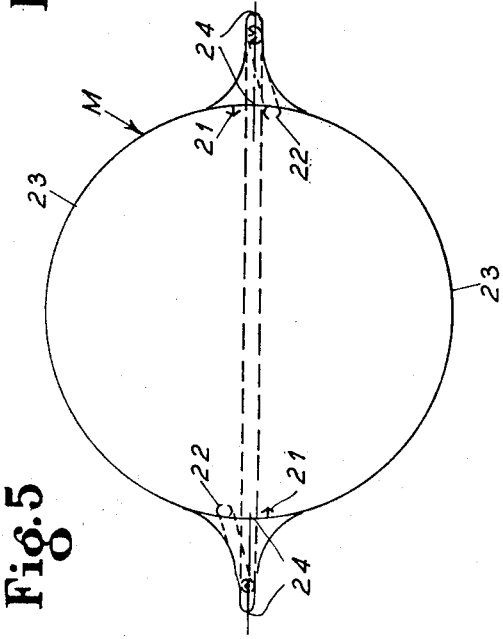
FIG. 5 is a schematic view taken substantially along the line V—V of FIG. 2.

From the imprinting station 25, the imprinted material M travels to a refolding and gusseting station 33 (FIG. 1) which desirably comprises an upright supporting frame 34 into the lower end of which the material M passes under a guide roller 35 into the nip of a pair of lower pinch rollers 37 from which the material passes upwardly into the nip of a pair of upper pinch rollers 38 which are located at a suitable elevation spaced above the rollers 37 to permit refolding of the material from the preprinted condition into the desired gusseted bag forming condition. Each of the pair of rollers 37 and 38 pinches the material together with sufficient firmness to trap an adequate static volume of air within the tube to cause the tube to balloon or expand into substantially tubular form as best seen in FIGS. 3 and 5. The air is trapped in the extent of the tubular material M between the rollers 37 and 38 at the start of operation of the apparatus, and is sufficiently retained so that even though the material M may travel at substantial rate of speed through the apparatus, the volume of the material-expanding air will remain substantially undiminished.

As the material M assumes the expanded tubular form (FIG. 5), the panels 23 are spread apart, the profiles 21 and 22 are snapped apart, and the side edges 24 are stretched out between the profiles at each side. Then as the tubularly expanded material M advances upwardly, the opposite longitudinal side edges 24 which are joined to the panels 23 are folded together in face-to-face relation, and the wall areas of each of the imprinted panels 23 are folded together in face-to-face relation. Also, the gusset area of each of the panels intermediate the bag wall areas of that panel are pin folded into gusset position between the folded bag wall areas of each of the panels. These steps are smoothly and efficiently effected by folding means 39 comprising a pair of convergently related panel folding plates 40 and cooperating gusset infolders 41.

Each of the panel folding plates 40 is of ample length (FIG. 2) and width (FIG. 3) to engage the tubularly ballooned material M at the opposite longitudinal side edges 24 and fold such side edges together into face-to-face relation and fold the imprinted wall areas of each of the panels together into face-to-face relation. In addition, mounting of the panels 40 is such as to permit incremental adjustment for optimum functioning. To this end, each of the panels 40 is mounted adjacent to its upper end pivotally by means of trunnions 42 fixed to the frame 34 and pivotally engaged by means of respective bearing bosses 43 on the outer upper end portions of the respective sides of the plate. Adjacent to their lower ends, the plates 40 are connected to adjustment means comprising respective adjustment screws 44 on which respective followers 45 are threadedly engaged, the followers having respective trunnions 47 engaged through respective bearing bosses 48 on the lower end portions of the outer side margins of the plates 40. In a preferred arrangement, the adjustment screws 44 are on opposite end portions of a respective common shaft 49 mounted rotatably on spaced brackets 50 carried by the frame 34. Between the brackets 50, the shaft 49 in each instance has wrench faces 51 by which the shaft is adapted to be rotated for effecting angular adjustments of the plates 40 relative to one another, the adjustment screw extensions 44 of the shaft being for this purpose threaded right-hand and left-hand, respectively, so that turning of the screw shaft 49 in either direction will effect equal and opposite relative adjustment movements of the folding plates 40. Through this arrangement, fine adjustment can be readily effected in the convergently related upper edges of the plates 40 and which edges are provided with respective opposed curved cam pressure surfaces 52 which cooperate in completing folding of the bag material M cooperatively with the gusset infolders 41.

Each of the infolders 41 comprises a body of generally triangular shape in vertical direction both in face elevation (FIG. 2) and in side elevation (FIG. 8). In face elevation, the base of the triangle is at the lower end of the body 41 and in side elevation, the base of the triangle is at the top end of the body. Through this arrangement, the side faces 53 of the body 41 converge toward an upper triangle crest edge 54 which is desirably at least as long as the depth of gusset to be formed by the device. An inner pressure face 55 on the body 41 extends from a broad lower base edge 57 in progressively narrower upward projection to the upper edge 54 which is in a vertical plane normal to the vertical plane of the lower edge 55. As best seen in FIG. 2, the upper edge 54 is located adjacently below the cam edge pressure surfaces 52 for presenting an infolded gusset to the pressure surfaces 52 in efficiently folded condition.

Each of the infolders 41 is mounted cooperatively adjacently under respective sides of the converging folding plates 40 in a manner to permit adjustment of the infolders for proper depth of gusset to be formed thereby. To this end, lower end portions of the outer faces of the members 41 are provided with means comprising spaced mounting ears 59 projecting outwardly and pivotally connected as by means of respective pins 60 to inner end portions of the mounting brackets 50 (FIGS. 2, 3, and 8). At their upper end portions, each of the infolders 41 has a central outwardly projecting mounting ear 61 pivotally connected as by means of a pin 62 to a clevis 63 having a threaded stem 64 which extends through a mounting hole 65 in the adjacent portion of the frame 34 and is secured in adjusted position by means of nuts 67 threadedly engaged on the stem 64. Through this arrangement, the upper gusset infolding end portions of the infolders 41 are adapted to be incrementally adjusted for the particular depth of gusset desired.

Figures 6, 7:
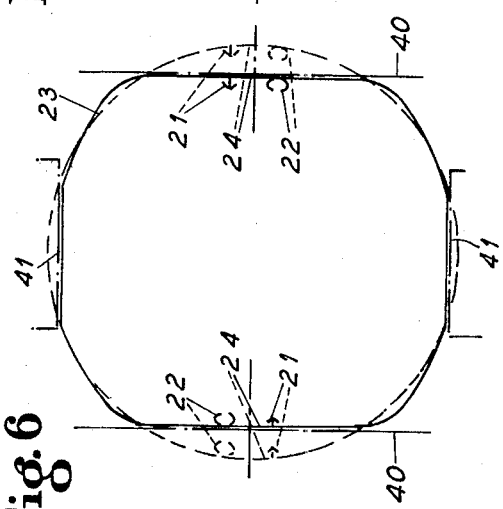
FIG. 6 is a schematic view taken substantially along the line VI—VI of FIG. 2.
FIG. 7 is a schematic view taken substantially along the line VII—VII of FIG. 2.

In operation of the folding means 39, the bag material M which has been expanded into tubular configuration as represented in FIG. 5, moves on upwardly into engagement with the folding plates 40 and infolders 41 which progressively collapse and fold the material into a plane normal to the plane in which the material is presented in collapsed condition at the nip of the infeed rollers 37. After the material M has become fully tubularly expanded above the rollers 37, the expanded tube enters into engagement substantially coincidently with the lower portions of the folding plates 40 and the lower portions of the infolders 41 (FIG. 6). Then as the material progresses upwardly, the profiles 21 and 22 are progressively folded toward one another and the panels 23 progressively folded upon themselves by the converging folding plates 40, while concurrently the infolders 41 function to progressively infold the intermediate gusset areas of the panels 23 (FIG. 7). As the thus folded and gusseted material M enters between the pressure cam edge surfaces 52, not only are the side edge areas 24 and bag wall areas of the folded panels 23 pushed into close face-to-face relation, but the profiles 21 and 22 are pressed together into interlocking fastener relation, as best viewed in FIG. 3. At the same time, the gussets 58 are flattened between the bag wall areas of the panels 23.

In order to assure that the cooperative profiles 21 and 22 will mate accurately, a guide device 68 is located within the folded gusseted material immediately above the folding plate edges 52. The construction and functioning of the device 68 may be substantially the same as described in U.S. Pat. No. Re. 28,959 comprising a floating member provided with longitudinal guide grooves through which the profiles 21 and 22 are longitudinally guided as the bag material advances toward the nip of the upper pinch rollers 38 where the profiles are reengaged in fastener relation after having been temporarily separated on passing the guide device 68. To any extent necessary for a more detailed description of the guide device 68, the disclosure in U.S. Pat. No. Re. 28,959 is incorporated herein by reference.

Beyond the refolding and gusseting station 33, the bag material may either be rewound for subsequent further processing, or may be immediately converted into gusseted bags are represented in FIG. 1. As shown, the material M advances above the pinch rollers 38 over a guide roller 69 to a looper 70 from which the material passes under a guide roller 71 to a bag forming station 72 employing known techniques for electronic or heat sealing the folded and gusseted bag material and more particularly the folded and gusseted panels 23 and separating the same into individual bags 73.

As shown in FIG. 9, in the folded and gusseted panels 23, the bag wall indicia 31 are on the opposite folded bag wall areas of the folded panel, and the gusset indicia 32 are on the gussets 58 which have been tucked in between the bag wall areas of the panels. Therefore, as folded and gusseted, the material M is adapted to be separated into two simultaneous series of the bags 73 as best visualized in FIG. 10. This is accomplished by effecting transverse tear seals 74 at spaced intervals across the bag material to provide sealed side edges for the bags 73, and separating the successive two-bag sections along a longitudinal line 75 between the two fasteners 21, 22 i.e. at the face to face initial side edges of the bag material to provide the separate bags 73 having the fasteners at the top of the bags and the gussets 58 at the bottom of the bags. The formed bags 73 may be stacked, or may be advanced immediately to a filling station (not shown) where any desired contents may be filled into the bags 73. By way of example, as shown in FIG. 12, after the bags have been filled with contents, not only will the bag wall area indicia 31 be in view, but also the indicia 32 on the expanded gusset area 58, which in this instance comprises the bottom of the bag 73. The fastener 21, 22 provides a convenient separable closure for the access mouth or top end of the bag at which the residual flanges of the original side edges 24 of the bag material provide convenient pull flanges for opening the bag when it is desired to gain access to the contents.

It will be understood that conventional driving and controlling means will be employed in connection with the desired apparatus. Because such means are well-known, the disclosure has not been incumbered with any specific showing or description thereof. It will be understood, of course, that the supply roll 15 may be driven, as for example, through the spindle 19 in coordination with the other apparatus in order to avoid drag on the advancing material. Also, the back-up rollers 27 and 28 in the imprinting station 25 may be suitably driven. Driving in unison of the sets of pinch rollers 37 and 38 is desirable. One or more of the looper rollers in the looper station 70 may be driven. Suitable drive means in the bag forming station 72 should also be provided. All of the driving means must, of course, be coordinated and may be under automatic and/or manual control.

It will be understood that variations and modifications may be effected without departing from the spirit and scope of the novel concepts of this invention.

I claim as my invention:

1. A method of making printed gusset-bottom bags from collapsed tubular bag material having longitudinal face-to-face panels joined to one another along opposite initial longitudinal side edges of the collapsed material and which edges are adapted for eventual separation of the panels from one another to define top ends for the bags, said panels being of sufficient width to derive complete bottom-gusseted bags from each panel when folded upon itself, and each panel being imprinted with indicia on bag wall areas and also imprinted with indicia on a respective gusset-bottom area intermediate the wall areas of each of the panels, the method comprising:

refolding said bag material by moving said imprinted panels away from one another and folding said joined opposite initial longitudinal side edges of the material into face-to-face relation, and folding said wall areas of each of said panels together into face-to-face relation upon one another;

infolding said gusset-bottom area of each of said panels into bottom-gusset position between said folded bag wall areas of each of said panels;

and separating the bottom-gusseted bag material along spaced transverse bag-side seal lines across the refolded bag material and along said face-to-face initial side edges and thereby providing individual bags having the gusset areas at their bottoms and the separated initial side edges at their tops so that when the bags are filled the bag wall areas and the bottom-gusset areas will expand and present to view not only the imprinted bag wall areas but also the imprinted expanded gusset-bottom area of each of the bags.

2. A method according to claim 1, which comprises inserting air into the tubular bag material and thereby moving said imprinted panels away from one another.

3. A method according to claim 1, which comprises sequentially separating the bottom-gusseted bag material along spaced transverse lines into two-bag sections in which said face-to-face initial side edges of the bag material are at the top ends of the still joined two bags in each section, sealing the separated edges of the sections, and separating said sections at said face-to-face initial side edges of the material to provide top ends for the separated individual bag with said gusset areas at the bottom ends of the bags.

4. A method according to claim 1, wherein said tubular bag material comprises a plastic extrusion having separable fastener profiles on the inside of said panels and connected together in fastener relation and thus connecting the panels on the inside of said initial longitudinal side edges and thus holding the panels in stable relation for imprinting, imprinting said bag wall areas and said gusset bottom areas while said fastener profiles are thus connected together, effecting separation of said fastener profiles along each of said initial side edges upon moving of said panels away from one another, joining said fastener profiles of each of said panels together in the folding of the joined initial opposite longitudinal side edges into face-to-face relation so that on each panel its joined fastener profiles are in spaced adjacent relation to the joined fastener profiles of the other folded panel, and effecting separation of the individual bags between the spaced joined fastener profiles so that the profiles are at top ends of the bags.

5. A method according to claim 1, which comprises advancing said material between spaced pinch rollers, expanding the tubular bag material into tubular shape by air pressure within the tubular material between said pinch rollers, and effecting said folding and infolding as the air expanded material advances between the pinch rollers.

6. A method according to claim 1, which comprises effecting said folding by advancing the material between convergently related folding panels.

7. A method according to claim 1, which comprises effecting said infolding by advancing said material between spaced cooperating infolders.

8. A method according to claim 1, which comprises effecting said folding by advancing said material between convergently related folding plates, and effecting said infolding by engaging the advancing material with infolders cooperatively related to said folding plates.

9. A method according to claim 8, comprising facilitating said folding and infolding by effecting air pressure within the tubular bag material and expanding the material into tubular condition and then effecting said folding and infolding.

10. Apparatus for making imprinted gusset-bottom bags from collapsed tubular bag material having longitudinal face-to-face panels joined to one another along opposite initial longitudinal side edges of the collapsed material and which edges are adapted for eventual separation of the panels from one another to define top ends for the bags, said panels being of sufficient width to derive complete bottom-gusseted bags from each panel when folded upon itself, and each panel being imprinted with indicia on bag wall areas and also imprinted with indicia on a respective gusset-bottom area intermediate the wall areas of each of the panels, the apparatus comprising:

means for refolding said bag material by moving the imprinted panels away from one another and folding said joined opposite initial longitudinal side edges of the material into face-to-face relation and for folding said wall areas of each of said panels together into face-to-face relation upon one another;

means for infolding said gusset-bottom area of each of said panels into bottom gusset position between said folded bag wall areas of each of said panels;

and means for separating the bottom-gusseted bag material along spaced transverse bag-side seal lines across the refolded bag material and along said face-to-face initial side edges for thereby providing individual bags having the gusset areas at their bottoms and the separated initial side edges at their tops so that when the bags are filled the bag wall areas and the gussets will expand and present to view not only the imprinted bag wall areas, but also the imprinted expanded gusset-bottom area of each of the bags.

11. Apparatus according to claim 10, wherein said apparatus includes an upright frame through which the collapsed tubular material is adapted to be advanced in an upward direction, a pair of pinch rollers in the lower portion of said frame for receiving the collapsed tubular bag material, a pair of pinch rollers in the upper portion of said frame for receiving the material after it has been folded by said folding means and gusseted by said infolding means, said pinch rollers maintaining a volume of air within the tubular bag material in the extent of the material between said upper and lower pinch rollers and by means of which the imprinted panels are moved away from one another, said means for folding comprising a pair of upwardly convergently related folding plates operative on said tubularly expanded material before the material reaches said upper pinch rollers, and said means for infolding comprising infolders located in cooperative relation to said folding plates adjacently under said plates.

12. Apparatus according to claim 10, wherein said means for moving the imprinted panels away from one another comprise a pair of spaced pinch rollers between which the tubular bag material is advanced, and a volume of air within and expanding the bag material into tubular form between said pinch rollers, said means for folding and said means for infolding being operative for respectively folding and infolding on the tubularly expanded material advancing between said pinch rolls.

13. Apparatus according to claim 10, wherein said means for folding comprise convergently related folding panels.

14. Apparatus according to claim 10, wherein said means for infolding comprise cooperating infolders cooperatively related to said folding means.

15. Apparatus according to claim 10, wherein said means for folding comprise convergently related folding panels having pressing surfaces at the convergent ends of the panels.

16. Apparatus according to claim 10, wherein said means for infolding comprise cooperatively related generally triangularly shaped infolding members.

17. Apparatus according to claim 10, wherein said means for folding comprise convergently related folding plates, and said means for infolding comprise generally triangularly shaped infolders cooperatively related to the folding plates.

18. Apparatus according to claim 17, comprising means for mounting said folding plates adjustably relative to one another, and means for mounting said infolders adjustably relative to one another.

19. Apparatus according to claim 11, wherein said folding plates comprise flat panels, and said infolders comprise generally triangularly shaped members each of which has surfaces extending from a lower edge elongated in an plane normal to said folding plates to an upper edge elongated in a plane parallel to the upper edges of said folding plates and located adjacently below said upper edges of the folding plates.

* * * * *

UNITED STATES PATENT AND TRADEMARK OFFICE
CERTIFICATE OF CORRECTION

PATENT NO. : 4,262,581

DATED : April 21, 1981

INVENTOR(S) : Robert A. Ferrell

It is certified that error appears in the above—identified patent and that said Letters Patent is hereby corrected as shown below:

Column 1, line 41, "In a preferred form, . . . " should start a new paragraph.

Column 2, line 30, for "plane" read --plan--.

Column 4, line 29, for "pin folded" read --infolded--.

Signed and Sealed this

Fourth Day of May 1982

[SEAL]

Attest:

Attesting Officer

GERALD J. MOSSINGHOFF

Commissioner of Patents and Trademarks